United States Patent [19]

Bononi

[11] 4,405,852

[45] Sep. 20, 1983

[54] PROCESS FOR DECORATING SPECTACLE FRAMES

[76] Inventor: Walter Bononi, Zeppelinstrasse 9, 7012 Fellbach Schmieden, Fed. Rep. of Germany

[21] Appl. No.: 248,724

[22] Filed: Mar. 30, 1981

[30] Foreign Application Priority Data

Apr. 15, 1980 [DE] Fed. Rep. of Germany ....... 3014361

[51] Int. Cl.³ .............................................. B23K 27/00
[52] U.S. Cl. ........................ 219/121 LJ; 219/121 LQ
[58] Field of Search .... 219/121 LM, 121 L, 121 LN, 219/121 LG, 121 LH, 121 LJ, 121 LR, 121 LE, 121 LF, 121 LA

[56] References Cited

U.S. PATENT DOCUMENTS

| | | | |
|---|---|---|---|
| 3,262,122 | 7/1966 | Fleisher et al. | 219/121 LJ X |
| 4,092,518 | 5/1978 | Merard | 219/121 LJ |
| 4,172,219 | 10/1979 | Deml et al. | 219/121 LJ X |
| 4,328,410 | 5/1982 | Slivinsky et al. | 2154/121 LJ |

OTHER PUBLICATIONS

Anon, *Electronics*, "Lasers Strip Wire Insulation", vol. 49, No. 19, pp. 50,52, Sep. 16, 1976.

*Primary Examiner*—C. L. Albritton

[57] ABSTRACT

The process provides a method of decorating spectacle frame parts by removing a jacket material from the core according to a decorative pattern, thus exposing a bright surface of the core. The jacket material is removed by a laser beam, the energy of which lies below the energy level required to weld the metal and above the energy level required to evaporate the jacket. A mirror apparatus in the path of the laser beam is controlled to the desired course of the decoration, to control the point of impingement of the laser beam on the jacket.

7 Claims, 2 Drawing Figures

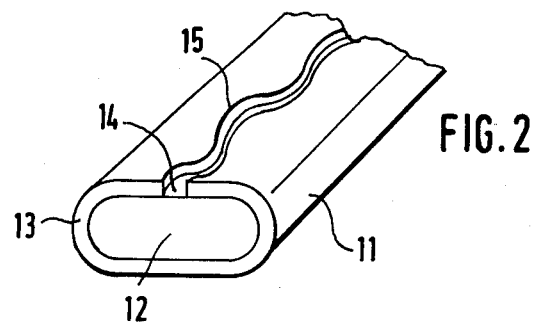

PROCESS FOR DECORATING SPECTACLE FRAMES

This invention relates to a process for decorating spectacle frame parts of a structure such that the core is of a metal with a bright surface and bears a jacket of different material.

Such spectacle frame parts are, for example, the temples with a curved earpiece and the eye rims, or coverings belonging to these.

BACKGROUND OF THE INVENTION

In the administration of justice it is recognized that photographs of persons can be de-individualized by placing a comparatively narrow black rectangle over the eye region of the person concerned. In other words: this part of the person is one which individualizes people.

For spectacles, this means that they must be seated exactly right and that they must be individual, so as not to give a mass-produced impression.

Spectacle frame manufacturers and their spectacle frames seek to solve this problem in many different ways. One possibility is jeweled spectacles. However, this requires the work of a goldsmith or the like to individualize the frames one at a time. Attempts have also been made to produce initials which, for example, were fixed on the outside to the temples. Such efforts have been able to achieve partial acceptance. Other efforts, which operated, for example, with unit construction systems, i.e., with different combinations of eye rims and temples with curved earpieces, could not gain acceptance.

OBJECT AND STATEMENT OF THE INVENTION

The object of the invention is to provide a process by which spectacles of the kind mentioned above can be made very individual without a substantial cost factor thereby arising.

According to the invention, this object is achieved in that the part is placed in the path of a laser beam, the energy of which lies below the metal welding energy but above the energy required for evaporation of the jacket, and that a mirror apparatus in the path of the beam, controllable according to the course of the decoration, controls the point at which the laser beam impinges on the jacket.

The power consumption of such a laser is very small. The operating speed is high. By entering into the data processing equipment controlling the mirror solely the basic pattern, and making the specific execution dependent on random counts—as is usual for cathode ray tube graphics —the spectacle frame parts can be individualized such that none among thousands is like another, and this without additional cost.

Solid state lasers, e.g., a continuous wave Nd YAG solid state laser with a wavelength of $1.06/\mu m$, are, in particular, suitable for such lasers. These differ from lasers used for welding, which have a wavelength about an order of magnitude smaller and a considerably higher energy.

In the laser used in the process according to the invention, use is made of the fact that it evaporates only the jacket but does not weld the metallic core.

Although $CO_2$ lasers are usually used for welding operations, a substantially weaker laser could also be used for the process according to the invention.

Advantageously, the invention includes the following additional features:

Proving a metal coil with a jacket of plastic material covers the jacketings occurring most frequently.

It has, however, also been shown that not only plastics, but also black metal jackets, particularly black chromium-plated nickel, can be included in the decoration.

Coloring the plastic jacket black clear through results in the absorption coefficient being high.

The plastic jacket can also be water color and colored after the frame part is decorated. Thus, plastics with lower absorption coefficients can also be used. It is clear that the cores are always gold-colored or silver-colored, and that the plastics must provide a contrast to it.

When the process is carried out with a solid state laser with a continuous wave power of several watts and a wavelength in the $1\mu m$ region, parts have been processed with very good results.

DESCRIPTION OF THE DRAWINGS

The process will now be described with reference to a specific example of an embodiment, taken together with the drawings in which:

FIG. 2 is a perspective view of a decorated part.

DETAILED DESCRIPTION

Figure 1:
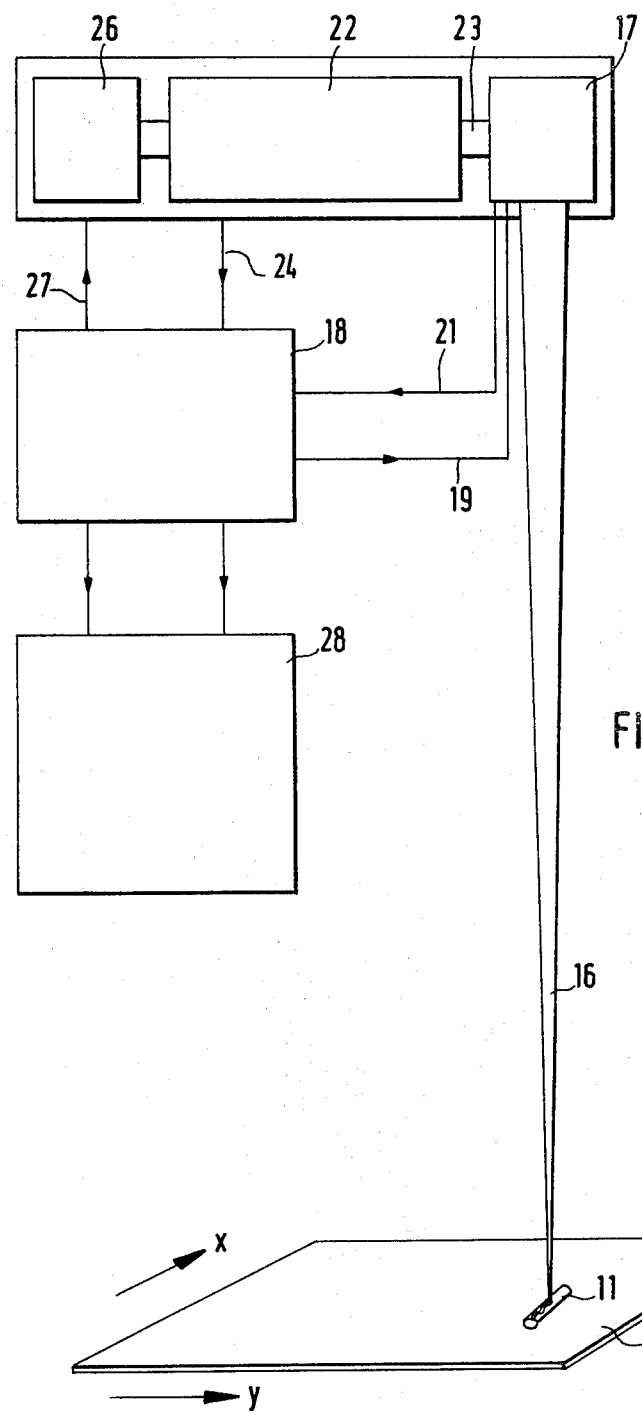
FIG. 1 is a perspective view of the apparatus with circuit block diagrams.

On a table 10, which can be moved in the X and Y directions in a manner not shown, lies a part 11 to be decorated. Its core 12 consists of black-chromed nickel. The particular design that the apparatus will decorate on this part 11 is a wavy line 15. Instead of the wavy line, any other graphics can also be used. For example, no continuous line needs to be used, since, of course, the laser can be keyed to be dark intermittently. The pattern can be made floral or abstract, or otherwise according to the wishes of the designer or customer. At the base 14 of the wavy line 5, which is a few tenths of a millimeter wide, the metal of the core 12 can be seen to shine. The base 14 is not, however, damaged in any way, e.g., it is not welded at all.

As working medium, a laser beam 16 is used which has passed a beam deflector 17, basically consisting of a mirror arrangement controlled by a microprocessor 18, via conductor 19 and reporting back its position via a conductor 21. A laser 22 emits its beam 23 towards the beam deflector 17. The state of oscillation of the laser 22 is controlled by a Q-switch 26 which is in turn controlled by the microprocessor 18 via conductor 27.

The microprocessor 18 is furthermore controlled by a control system 28 which has an input with a data view screen. The control system 28 accommodates the program for production of the wavy line 15.

In the example of an embodiment, the finished, decorated part must of course be protected with lacquer, as the nickel core otherwise lies exposed and would oxidize.

I claim:

1. A process of decorating spectacle frame parts provided with a metal core having a bright surface, with a jacket of a different material over the core, comprising:

Placing the frame part in the path of a laser beam, the energy of which lies below the energy required to weld the metal and above the energy required to evaporate the jacket, and Controlling a mirror apparatus in the path of the laser beam, according to the desired course of the decoration, to control the point of impingement of the laser beam on the jacket.

2. The process according to claim 1, comprising providing a metal core with a jacket of plastic material.

3. The process according to claim 2, comprising providing a metal core, with a plastic jacket that is colored through black.

4. The process according to claim 2, comprising providing a metal core with a jacket of plastic material that is water-clear and coloring the jacket after the frame part is decorated.

5. The process according to claim 1, comprising providing a metal core with a jacket of black metal.

6. The process according to claim 1, comprising providing a metal core with a jacket of black chromium-plated nickel.

7. The process according to claim 1, comprising generating the laser beam by use of a solid state laser with a continuous wave power of several watts and a wavelength in the 1 $\mu$m region.

* * * * *